（12）United States Patent
Sitaram et al.

(10) Patent No.: US 9,345,049 B1
(45) Date of Patent: May 17, 2016

(54) ALLOCATING ROOT SEQUENCES TO ACCESS NODES

(71) Applicant: Sprint Spectrum LP, Overland Park, KS (US)

(72) Inventors: Krishna Sitaram, Chantilly, VA (US); Daniel Vivanco, Sterling, VA (US); Saravana Velusamy, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 112 days.

(21) Appl. No.: 14/084,607

(22) Filed: Nov. 19, 2013

(51) Int. Cl.
*H04W 74/08* (2009.01)

(52) U.S. Cl.
CPC .................................. *H04W 74/0833* (2013.01)

(58) Field of Classification Search
None
See application file for complete search history.

(56) References Cited

U.S. PATENT DOCUMENTS

| 8,098,745 | B2 | 1/2012 | Bertrand et al. | |
|---|---|---|---|---|
| 2008/0316961 | A1 | 12/2008 | Bertrand et al. | |
| 2009/0046629 | A1 | 2/2009 | Jiang et al. | |
| 2010/0210255 | A1* | 8/2010 | Amirijoo et al. | 455/419 |
| 2012/0046065 | A1* | 2/2012 | Amirijoo et al. | 455/524 |
| 2014/0211606 | A1* | 7/2014 | Bergman | H04W 36/08 370/217 |
| 2014/0211677 | A1* | 7/2014 | Barbieri et al. | 370/311 |
| 2014/0219109 | A1* | 8/2014 | Shukair et al. | 370/252 |
| 2015/0085810 | A1* | 3/2015 | Mauritz | 370/329 |
| 2015/0124716 | A1* | 5/2015 | Li et al. | 370/329 |

* cited by examiner

*Primary Examiner* — Benjamin H Elliott, IV

(57) ABSTRACT

In systems and methods of allocating root sequences to access nodes, a first coverage radius and a first neighbor list of a first access node are determined, wherein the first neighbor list comprises second access nodes which are each a neighbor access node of the first access node. A second coverage radius and a second neighbor list of each of the second access nodes is then determined. An access node comprising a largest coverage radius from among the first access node and the second access nodes is selected. A number of root sequences required for the selected access node is calculated based on the coverage radius of the selected access node, and root sequences are assigned to the selected access node according to the number of root sequences required.

20 Claims, 5 Drawing Sheets

ALLOCATING ROOT SEQUENCES TO ACCESS NODES

TECHNICAL BACKGROUND

To initiate the establishment of a communication link with an access node, a wireless device may perform an initial synchronization process and a random access procedure. To perform the random access procedure, the wireless device typically selects a random access (RACH) preamble, and the wireless device can use the selected RACH preamble to transmit an initial access request to the access node. The randomly selected preamble can distinguish the wireless device's initial access request from other similar requests from other wireless devices. Access node preambles can be determined based on a unique sequence such as a root sequence. The same root sequence is typically not assigned to more than one access node in proximity to one other access nodes, to mitigate confusion among initial access requests received by the access nodes.

Preambles for each access node can then be obtained based on, for example, a cyclic shift of the assigned root sequence. The cyclic shift value can depend on the size of the coverage area of each access node, as well as other factors such as delay spread factors. In many cases, the larger the coverage area of the access node, the larger the cyclic shift which is required. Because root sequences cannot be assigned to more than one access node in relative proximity to other access nodes, root sequence assignment is an important consideration in network configuration.

Overview

In operation, a first coverage radius of a first access node is determined, as well as a first neighbor list of the first access node. The first neighbor list comprises second access nodes which are each a neighbor access node of the first access node. A second coverage radius and a second neighbor list of each of the second access nodes is determined. An access node comprising a largest coverage radius from among the first access node and the second access nodes is selected. A number of root sequences required for the selected access node is calculated based on the coverage radius of the selected access node, and root sequences are assigned to the selected access node according to the number of root sequences required.

DETAILED DESCRIPTION

Figure 1:
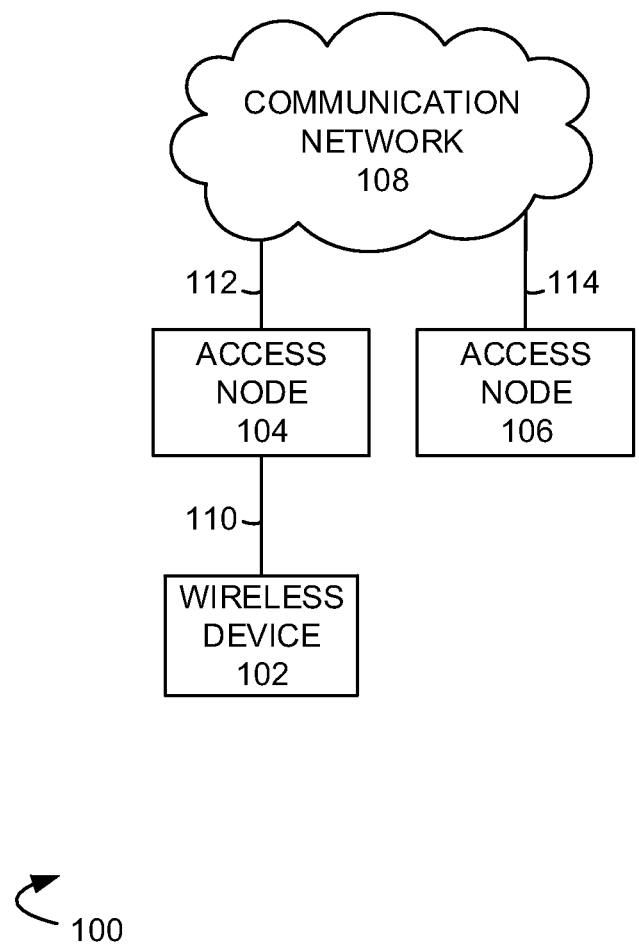
FIG. 1 illustrates an exemplary communication system to allocate root sequences to access nodes in a wireless communication system.

FIG. 1 illustrates an exemplary communication system 100 to allocate root sequences to access nodes in a wireless communication system comprising wireless device 102, access node 104, access node 106, and communication network 108. Examples of wireless device 102 can comprise a cell phone, a smart phone, a computing platform such as a laptop, palmtop, or tablet, a personal digital assistant, or an internet access device, including combinations thereof. Wireless device 102 can communicate with access node 104 over communication link 110.

Access node 104 and access node 106 are each a network node capable of providing wireless communications to wireless device 102, and can be, for example, a base transceiver station, a radio base station, an eNodeB device, or an enhanced eNodeB device. Access node 104 is in communication with communication network 108 over communication link 112, and access node 106 is in communication with communication network 108 over communication link 114. In an embodiment, access nodes 104 and 106 can be located in proximity to each other, and each access node can be a neighbor access node of the other.

Communication network 108 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying voice information and other data, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 may also comprise a wireless network, including base stations, wireless communication nodes, telephony switches, internet routers, network gateways, computer systems, communication links, or some other type of communication equipment, and combinations thereof.

Communication links 110, 112 and 114 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 104, access node 106 and communication network 108 which are omitted for clarity, including additional processing nodes, routers, gateways, and physical and/or wireless data links for carrying data among the various network elements.

Access node preambles can be determined based on a unique sequence such as a root sequence. To mitigate confusion among initial access requests received by access nodes, typically a unique root sequence is assigned to access nodes in proximity to one another. Preambles for each access node can then be obtained based on, for example, a cyclic shift of the assigned root sequence. The cyclic shift value can depend on the size of the coverage area of each access node, as well as other factors such as delay spread factors. In many cases, the larger the coverage area of the access node, the larger the cyclic shift which is required. Accordingly, an access node with a relatively large coverage area may require more than one root sequence to generate the requisite number of preambles for the access node. On the other hand, an access node with a relatively small coverage areas may use a smaller cyclic shift, and may therefore require only one root sequence to generate the requisite number of preambles for the access node. Because root sequences cannot be assigned to more than one access node in relative proximity to other access nodes, root sequence assignment is an important consideration in network configuration.

Configuring root sequences for access nodes based on an assumed fixed coverage radius, such as an average coverage radius of access nodes in a market or a geographic area, limits the number of available root sequences for assignment to the access nodes. When the number of root sequences is limited, the number of available RACH preambles available for initial network access can be limited, and network performance can be degraded. For example, call setup requests from wireless device can be delayed when insufficient RACH preambles are available. Similarly, the transmission of data from wireless devices to access nodes can be delayed when an uplink transmission is resumed from a suspended state, due to a lack of available preambles. In addition, the rate of call setup success and handover success can also be degraded.

In operation, to allocate root sequences to access nodes in communication system 100, a first coverage radius of first access node 104 is determined and a first neighbor list of first access node 104 is also determined. The first neighbor list comprises second access nodes, for example, access node 106, which are each a neighbor access node of first access node 104. A second coverage radius and a second neighbor list of each of the second access nodes is then determined. For example a second coverage radius and a second neighbor list of access node 106 can be determined. Next, an access node comprising a largest coverage radius from among the first access node and the second access nodes is selected. A number of root sequences required for the selected access node is calculated based on the coverage radius of the selected access node, and root sequences are assigned to the selected access node according to the number of root sequences required.

In an embodiment, another access node comprising a next-largest coverage radius from is selected among the first access node and the second access nodes. For example, access node 106 may comprise the next-largest coverage radius after access node 104. A second number of root sequences required for the selected another access node is calculated based on the coverage radius of the selected another access node, and root sequences are assigned to the selected another access node according to the second number of root sequences required. In an embodiment, the root sequences assigned to the selected another access node are different than the root sequences assigned to the selected access node.

Figure 2:
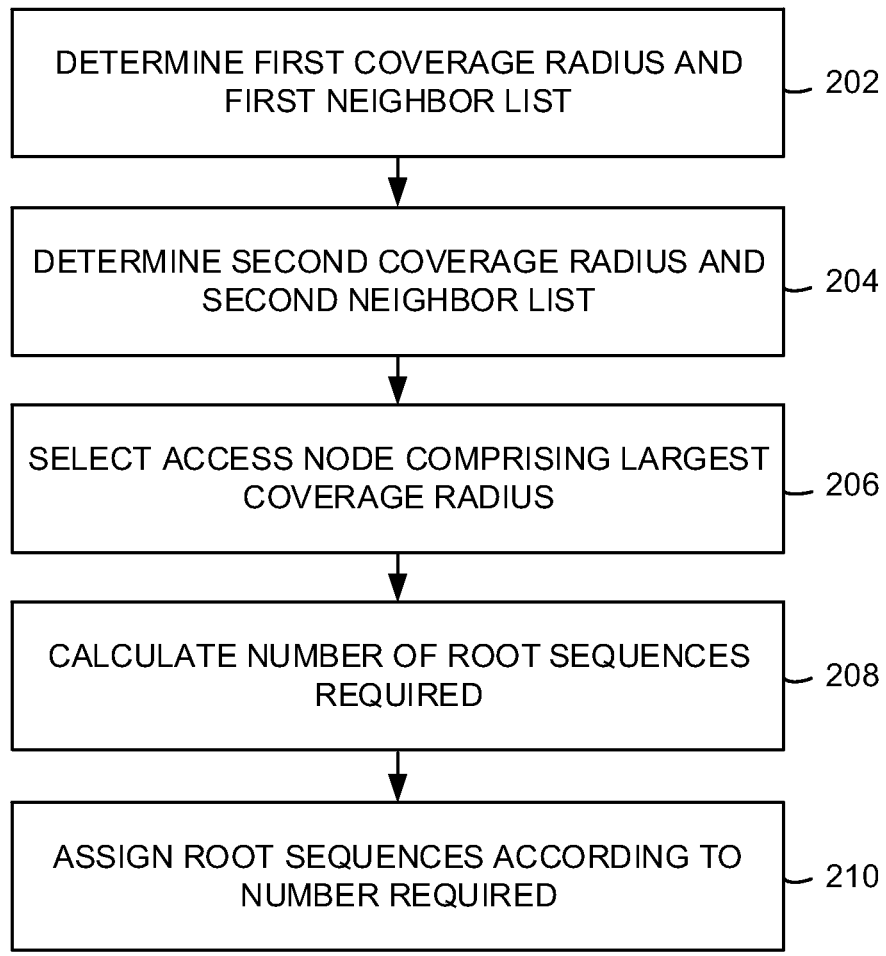
FIG. 2 illustrates an exemplary method of allocating root sequences to access nodes in a wireless communication system.

FIG. 2 illustrates an exemplary method of allocating root sequences to access nodes in a wireless communication system. In operation 202, a first coverage radius of a first access node and a first neighbor list of the first access node are determined. The first neighbor list comprises second access nodes which are each a neighbor access node of the first access node. For example, a first coverage radius of access node 104 can be determined. The coverage radius can comprise a distance from the access node in which at least one signal level transmitted by access node 104 which is detectable at or above a signal level threshold. The coverage radius can be determined for access node 104 or for a subset of a coverage area of access node 104, such as a sector of the access node.

In addition, a first neighbor list of access node 104 can be determined. The first neighbor list can comprise one or more access nodes in proximity to access node 104, such as access node 106. The first neighbor list can comprise access nodes comprising a coverage radius bordering or overlapping with the coverage radius of access node 104.

Next, a second coverage radius and a second neighbor list of each of the second access nodes is determined (operation 204). For example, a second coverage radius of access node 106, and a second neighbor list of access node 106, can be determined. The second coverage radius can comprise a radius in which at least one signal level transmitted by access node 106 which is detectable at or above a signal level threshold, and can be determined for access node 106 or for a subset of a coverage area of access node 106, such as a sector of the access node. The second neighbor list can comprise one or more access nodes in proximity to access node 106, which can comprise access nodes comprising a coverage radius bordering or overlapping with the coverage radius of access node 106. While the second neighbor list can comprise first access node 104, the second neighbor list will typically comprise at least one additional access node which is not a neighbor of access node 104.

In operation 206, an access node comprising a largest coverage radius from among the first access node and the second access nodes is selected. For example, access node 104, comprising a larger coverage radius than access node 106 or any other neighbor access node of access node 104, can be selected. An access node with a relatively large coverage area may require more than one root sequence to generate the requisite number of preambles for the access node. In an embodiment, 64 preambles can be generated for an access node, though the number of preambles required can be determined according to network access technology, communication protocols used in the communication system, available communication resources in wireless and wired communication links, and the like. On the other hand, an access node with a relatively small coverage areas may use a smaller cyclic shift, and may therefore require only one root sequence to generate the requisite number of preambles for the access node.

A number of root sequences required for the selected access node is calculated based on the coverage radius of the selected access node (operation 208). For example, when access node 104 is selected, based on the first coverage radius, a number of root sequences can be calculated. Then, root sequences are assigned to the selected access node according to the number of root sequences required (operation 210). Preambles for each access node can be obtained based on, for example, a cyclic shift of the assigned root sequence. The larger the cyclic shift, the larger the number of root sequences required by an access node. In operation, assigned root sequences are substantially consecutive, in part to enable wireless devices (e.g., wireless device 102) to determine the root sequences assigned to an access node, and to determine the available RACH preambles for the wireless device to initiate communication with the access node.

Figure 3:
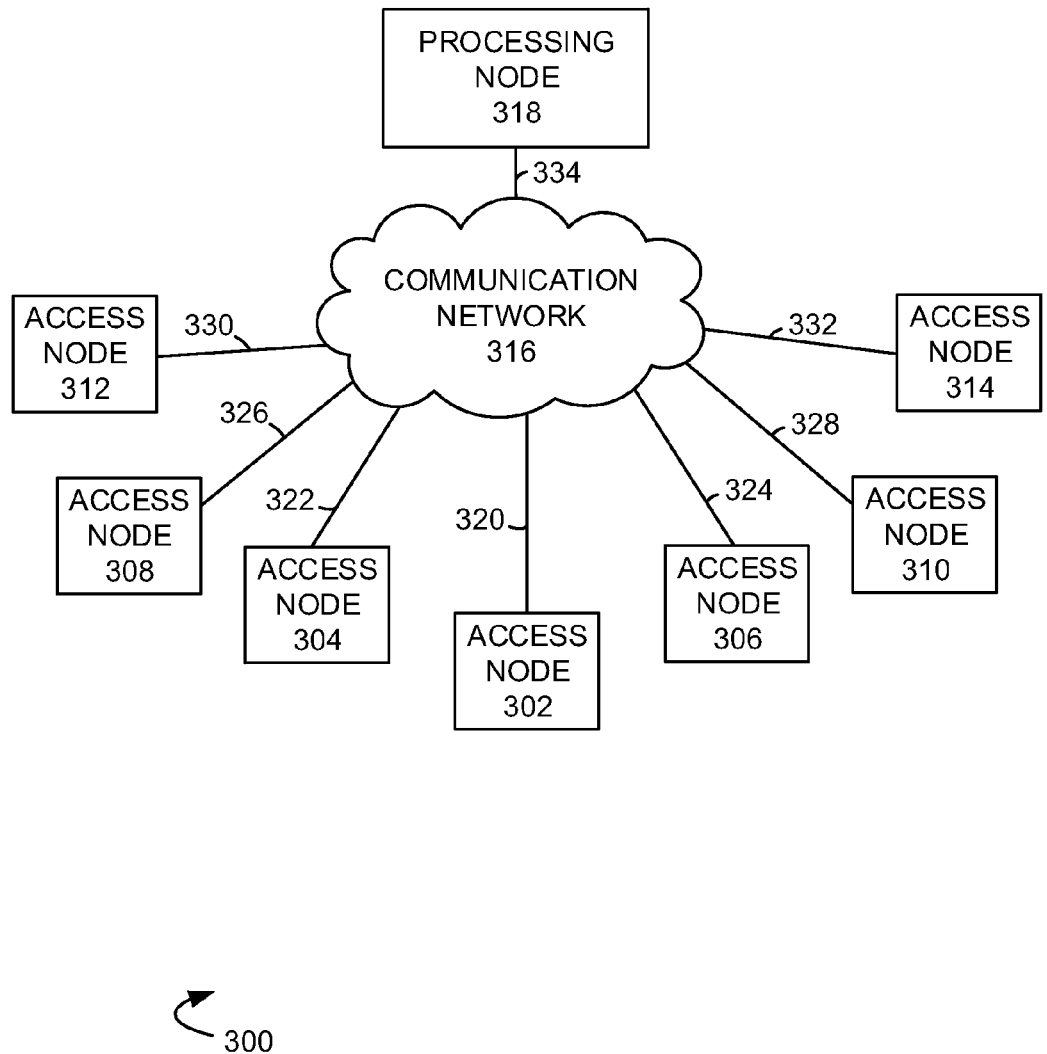
FIG. 3 illustrates another exemplary communication system to allocate root sequences to access nodes in a wireless communication system.

FIG. 3 illustrates another exemplary communication system 300 to allocate root sequences to access nodes in a wireless communication system comprising access nodes 302, 304, 306, 308, 310, 312, and 314, communication network 316, and processing node 318. Access nodes 302-314 are each a network node capable of providing wireless communications to a wireless device (such as wireless device 102), and can be, for example, a base transceiver station, a radio base station, an eNodeB device, or an enhanced eNodeB device. Access nodes 302, 304, 306, 308, 310, 312, and 314 are in communication with communication network 316 over communication links 320, 322, 324, 326, 328, 330 and 332, respectively. In an embodiment, access nodes 304 and 306 can comprise neighbor access nodes to access node 302. Similarly, access nodes 302 and 308 can comprise neighbor access nodes to access node 304; access nodes 312 and 304 can comprise neighbor access nodes to access node 308; access nodes 302 and 310 can comprise neighbor access nodes to access node 306; and access nodes 306 and 314 can comprise neighbor access nodes to access node 310.

Communication network 316 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 316 can be capable of carrying voice information and other data, for example, to support communications by a wireless device (such as wireless device 102, illustrated in FIG. 1). Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 316 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 316 may also comprise a wireless network, including base stations, wireless communication nodes, telephony switches, internet routers, network gateways, computer systems, communication links, or some other type of communication equipment, and combinations thereof.

Processing node 318 can comprise a processor and associated circuitry to allocate root sequences to access nodes in a communication system 300. Processing node 318 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Processing node 318 can receive instructions and other input at a user interface. Examples of processing node 318 can include a standalone computing device, a computer system, or a network component, such as a mobile switching center (MSC), a dispatch call controller (DCC), a mobility management entity (MME), an access service network gateway (ASN-GW), a packet data network gateway (P-GW), a serving gateway (S-GW), a mobile switching controller (MSC), a packet data serving node (PDSN), call processing equipment, a home agent, a radio node controller (RNC), a subscriber profile system (SPS), authentication, authorization, and accounting (AAA) equipment, and a network gateway, or another similar network node, including combinations thereof. Processing node 318 is in communication with communication network 316 over communication link 334.

Communication links 320-334 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between and among access nodes 302-314, communication network 316, and processing node 318, which are omitted for clarity, including additional processing nodes, routers, gateways, and physical and/or wireless data links for carrying data among the various network elements.

Figure 4:
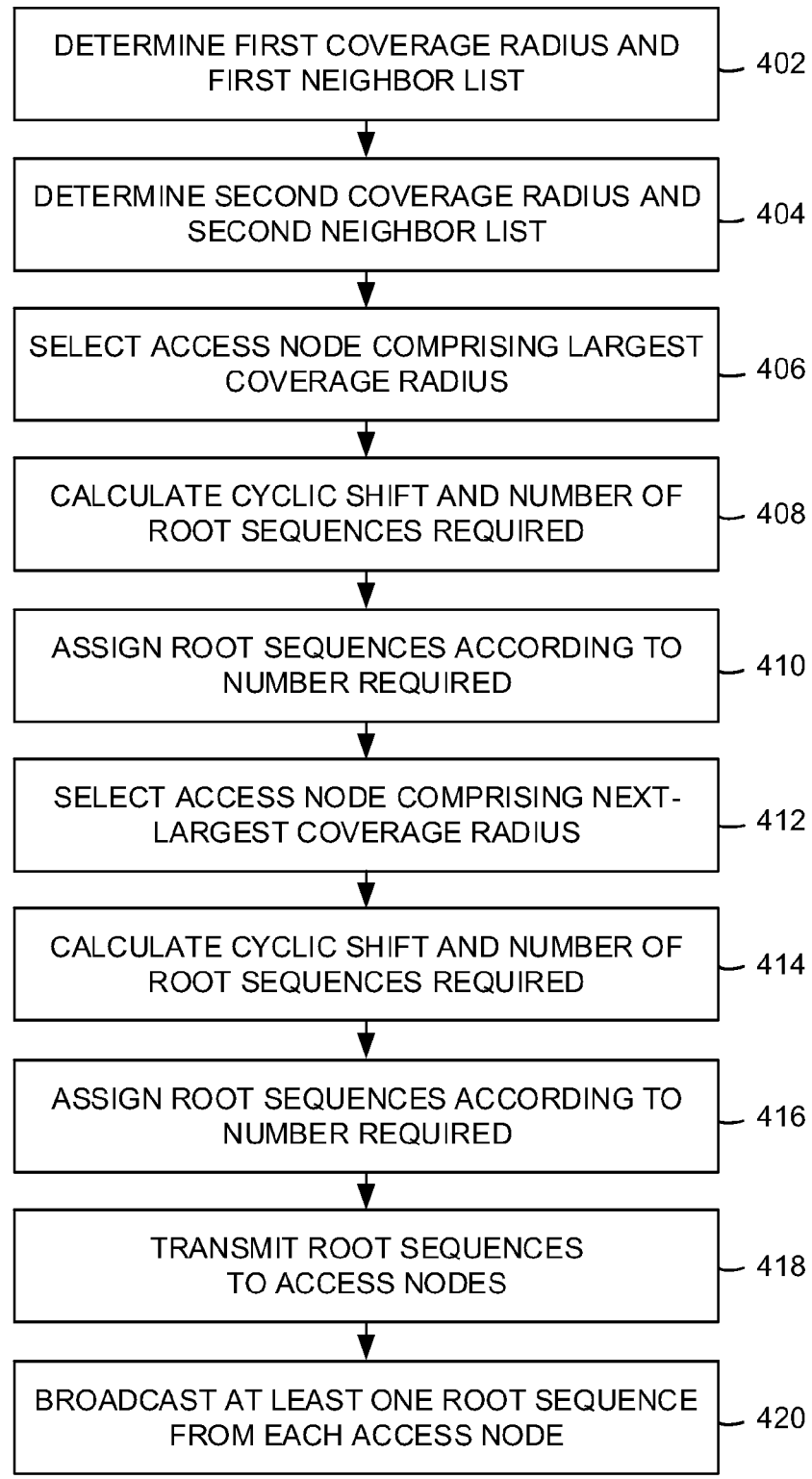
FIG. 4 illustrates another exemplary method of allocating root sequences to access nodes in a wireless communication system.

FIG. 4 illustrates another exemplary method of allocating root sequences to access nodes in a wireless communication system. In operation 402, a first coverage radius of a first access node and a first neighbor list are determined. The first neighbor list comprises second access nodes which are each a neighbor access node of the first access node. For example, a first coverage radius of access node 302 can be determined. The coverage radius can comprise a radius in which at least one signal level transmitted by access node 302 which is detectable at or above a signal level threshold. The coverage radius can be determined for access node 302 or for a subset of a coverage area of access node 302, such as a sector of the access node.

In addition, a first neighbor list of access node 302 can be determined. The first neighbor list can comprise one or more access nodes in proximity to access node 302, such as access nodes 304 and 306. The first neighbor list can comprise access nodes comprising a coverage radius bordering or overlapping with the coverage radius of access node 302. The first coverage radius and the first neighbor list can be determined by processing node 318, or by another network element of communication system 300. In an embodiment, processing node 318 can query access node 302 for the first neighbor list and the first coverage radius. Alternatively, or additionally, processing node 318 can receive information from each of access nodes 302-314 and can determine the first coverage radius and the first neighbor list based on the received information.

Next, a second coverage radius and a second neighbor list of each of the second access nodes is determined (operation 404). For example, a second coverage radius of each of access nodes 304 and 306, and a second neighbor list of each of access nodes 304 and 306, can be determined. The second coverage radius can comprise a radius in which at least one signal level transmitted by access nodes 304 and 306 which is detectable at or above a signal level threshold, and can be determined for access nodes 304 and 306 or for a subset of a coverage area of access nodes 304 and 306, such as a sector of an access node. The second neighbor list can comprise one or more access nodes in proximity to access nodes 304 and 306, which can comprise access nodes comprising a coverage radius bordering or overlapping with the coverage radius of access nodes 304 and 306. For example, a second neighbor list for access node 304 can comprise access nodes 308 and 302, and a second neighbor list for access node 306 can comprise access node 310 and access node 302. Access nodes 308 and 310 are not neighbors of access node 302, each having access nodes 304 and 306, respectively, interposed between access node 302 and access nodes 308 and 310. Thus, while the second neighbor list can comprise first access node 302, the second neighbor list will typically comprise at least one additional access node which is not a neighbor of access node 304.

In operation 406, an access node comprising a largest coverage radius from among the first access node and the second access nodes is selected. For example, access node 302, comprising a larger coverage radius than access nodes 304 and 306 or any other neighbor access node of access node 104, can be selected. An access node with a relatively large coverage area may require more than one root sequence to generate the requisite number of preambles for the access node. In an embodiment, 64 preambles can be generated for an access node, though the number of preambles required can be determined according to network access technology, communication protocols used in the communication system, available communication resources in wireless and wired communication links, and the like. On the other hand, an access node with a relatively small coverage areas may use a smaller cyclic shift, and may therefore require only one root sequence to generate the requisite number of preambles for the access node.

A cyclic shift is calculated for the selected access node, and a number of root sequences required for the selected access node is calculated based on the coverage radius and the cyclic shift of the selected access node (operation 408). For example, when access node 302 is selected, based on the first coverage radius, a cyclic shift can be calculated for access node 302. The larger the cyclic shift, the larger the number of root sequences required by an access node. Then, a number of root sequences can be calculated.

In an embodiment, the cyclic shift can be calculated based on a round trip delay and a delay spread associated with an access node. The round trip delay can comprise a time required for a signal to travel from an access node to a wireless device, and to be returned from the wireless device back to the access node. The delay spread can comprise a measure of multipath delay from an access node to a wireless device. In an embodiment, the delay spread can comprise a time difference between an arrival of a first multipath component and a second multipath component of a signal transmitted from the access node to the wireless device.

In operation 410, root sequences are assigned to the selected access node according to the number of root sequences required. Preambles for each access node can be obtained based on, for example, a cyclic shift of the assigned root sequence. In operation, assigned root sequences are substantially consecutive, in part to enable wireless devices (e.g., wireless device 102) to determine the root sequences assigned to an access node, and to determine the available RACH preambles for the wireless device to initiate communication with the access node. The number of assigned root sequences can comprise a length of a root sequence divided by the cyclic shift value. The length of the root sequence can be determined by an operator of communication network 300, or it can be determined according to a communication protocol used in communication system 300.

In operation 412, another access node is selected comprising a next-largest coverage radius from among the first access node and the second access nodes. For example, access node 304 can comprise the next-largest coverage radius of the group of access nodes 302-314, after access node 302, so access node 304 can be selected next. A cyclic shift and a number of root sequences required for the next selected access node is calculated based on the coverage radius of the selected access node (operation 414). For example, when access node 302 is selected, based on the first coverage radius, a number of root sequences can be calculated. Then, root sequences are assigned to the selected access node according to the number of root sequences required (operation 416). Preambles for each access node can be obtained based on, for example, a cyclic shift of the assigned root sequence. The larger the cyclic shift, the larger the number of root sequences required by an access node.

In operation, assigned root sequences are substantially consecutive, in part to enable wireless devices (e.g., wireless device 102) to determine the root sequences assigned to an access node, and to determine the available RACH preambles for the wireless device to initiate communication with the access node. Typically a unique root sequence is assigned to access nodes in proximity to one another, to mitigate potential confusion among access nodes when a wireless device sends a request to initiate communication with an access node. Thus, in operation, the root sequences assigned to the selected next-largest access node are different than the root sequences assigned to the selected access node. In an embodiment, a root sequence assigned to a first access node can be re-assigned to a second access node when the second access node does not include the first access node in its neighbor list. In operation, greater distance between access nodes can be used to mitigate possible confusion caused by re-use of root sequences, such as requiring that a root sequence is only re-assigned to a second access node which is three tiers away from the first access node (i.e., a neighbor of a neighbor of a neighbor of the first access node). For example, a root sequence assigned to access node 302 could be re-assigned to access node 312 or 314, but not to access nodes 304, 306, 308 or 310.

When root sequences are assigned to the first and second access nodes, the root sequences are transmitted to the respective access nodes (operation 418). The root sequences can be transmitted via communication network 316 to each of the recipient access nodes and stored at each of the access nodes. In an embodiment, the root sequences themselves can be transmitted to the access nodes. Additionally, or alternatively, an index or another indicator of the root sequences, such as a root sequence indicator, can be transmitted to each access node to indicate the assigned root sequences. The root sequence index can then be used by each access node to determine the specific root sequences assigned.

In operation 420, at least one assigned root sequence is broadcast from each access node. The root sequence can be broadcast in a system information message to provide the root sequence to a wireless device for use in formulating an initial access request to an access node. In an embodiment, the root sequence can be broadcast in a system information block message. Additionally, or alternatively, information derived from a root sequence, such as a preamble, or an index of available preambles, can be broadcast by each access node. A wireless device which received the at least one assigned root sequence (and/or the preamble or index of preambles) can use the received information to determine at least one random access preamble, and can use the preamble to request initial access to the access node, e.g., through a random access procedure. In an embodiment, the at least one root sequence broadcast by the access node can enable a wireless device to determine one or more random access preambles. The wireless device can then use the one or more determined random access preambles to perform a random access procedure to initiate communication with an access node.

Figure 5:
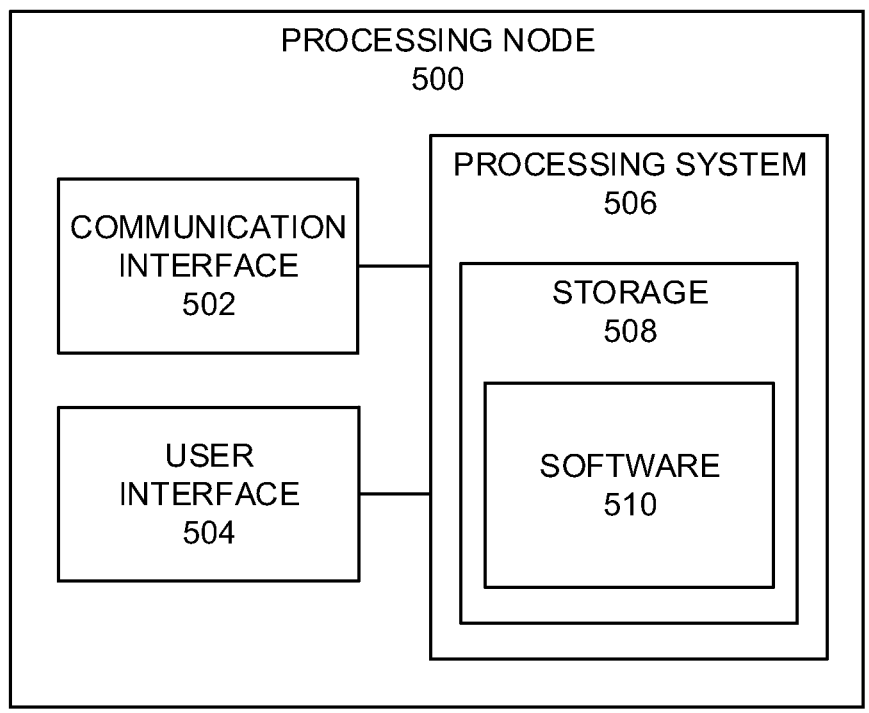
FIG. 5 illustrates an exemplary processing node.

FIG. 5 illustrates an exemplary processing node 500 in a communication system. Processing node 500 comprises communication interface 502, user interface 504, and processing system 506 in communication with communication interface 502 and user interface 504. Processing node 500 can be configured to allocate root sequences to access nodes in a wireless communication system. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

Examples of processing node 500 include a gateway node and a controller node, such as processing node 318. Processing node 500 can also be an adjunct or component of a network element, such as an element of access node 104, 302, or another access node as illustrated in FIGS. 1 and 3. Processing node 500 can also be another network element in a communication system. Further, the functionality of processing node 500 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method of allocating root sequences to access nodes in a wireless communication system, comprising:
   determining a first coverage radius of a first access node and a first neighbor list, the first neighbor list comprising second access nodes which are each a neighbor access node of the first access node;
   determining a second coverage radius and a second neighbor list of each of the second access nodes;
   selecting an access node comprising a largest coverage radius from among the first access node and the second access nodes;
   calculating a number of root sequences required for the selected access node based on the coverage radius of the selected access node; and
   assigning root sequences to the selected access node according to the number of root sequences required such that root sequences are assigned to the selected access node prior to the access node that is not selected from among the first and second access nodes based on the largest coverage radius for the selected access node, wherein the assigned root sequences are used to generate preambles that wireless devices transmit to the selected access node to gain access to the wireless communication system.

2. The method of claim 1, further comprising:
   selecting another access node comprising a next-largest coverage radius from among the first access node and the second access nodes;
   calculating a second number of root sequences required for the selected another access node based on the coverage radius of the selected another access node; and
   assigning root sequences to the selected another access node according to the second number of root sequences required.

3. The method of claim 2, wherein the root sequences assigned to the selected another access node are different than the root sequences assigned to the selected access node.

4. The method of claim 2, wherein the root sequences assigned to the selected access node are not assigned to the selected another access node and to an access node of the neighbor list of the another access node.

5. The method of claim 2, wherein the number of root sequences assigned to the selected access node is greater than a number of root sequences assigned to the selected another access node based on the selected access node having a larger coverage radius than the selected another access node.

6. The method of claim 1, further comprising:
   calculating a cyclic shift for the selected access node; and
   calculating the number of root sequences node based on the cyclic shift.

7. The method of claim 1, further comprising:
broadcasting from the selected access node at least one of the assigned root sequences to enable a random access procedure to be performed by a wireless device.

8. The method of claim 7, further comprising:
broadcasting from the selected access node at least one of the assigned root sequences to enable the determination of one or more random access preambles by a wireless device for the performance of a random access procedure by the wireless device.

9. A method of allocating root sequences to access nodes in a wireless communication system, comprising:
providing to a processing node a first coverage radius of a first access node and a first neighbor list, the first neighbor list comprising second access nodes which are each a neighbor access node of the first access node;
providing to the processing node a second coverage radius and a second neighbor list of each of the second access nodes;
receiving at the first access node first root sequences assigned to the first access node by the processing node when the first access node is determined to comprise a largest coverage radius from among the first access node and the second access nodes, wherein the root sequences are calculated based on the coverage radius of the first access node such that root sequences are assigned to the first access node prior to the second access node based on the largest coverage radius for the first access node, and wherein the assigned root sequences are used to generate preambles that wireless devices transmit to the first access node to gain access to the wireless communication system.

10. The method of claim 9, further comprising:
receiving at another access node second root sequences assigned to the another access node by the processing node when the another access node is determined to comprise a next-largest coverage radius from among the first access node and the second access nodes, wherein the root sequences are calculated based on the coverage radius of the another access node.

11. The method of claim 10, wherein the root sequences assigned to the another access node are different than the root sequences assigned to the first access node.

12. The method of claim 11, wherein the root sequences assigned to the first access node are not assigned to the another access node and to an access node on the second neighbor list.

13. The method of claim 10, further comprising:
broadcasting from each of the first access node and the another access node at least one of the respectively assigned root sequences to enable a random access procedure to be performed by a wireless device.

14. The method of claim 9, further comprising:
receiving at the first access node first root sequences assigned to the first access node by the processing node when the first access node is determined to comprise a largest coverage radius from among the first access node and the second access nodes, wherein a cyclic shift is calculated for the first access node, and the root sequences are calculated based on the coverage radius and the cyclic shift of the first access node.

15. A system of allocating root sequences to access nodes in a wireless communication system, comprising:
a processing node, configured to
determine a first coverage radius of a first access node and a first neighbor list, the first neighbor list comprising second access nodes which are each a neighbor access node of the first access node;
determine a second coverage radius and a second neighbor list of each of the second access nodes;
select an access node comprising a largest coverage radius from among the first access node and the second access nodes;
calculate a number of root sequences required for the selected access node based on the coverage radius of the selected access node; and
assign root sequences to the selected access node according to the number of root sequences required such that root sequences are assigned to the selected access node prior to the access node that is not selected from among the first and second access nodes based on the largest coverage radius for the selected access node, wherein the assigned root sequences are used to generate preambles that wireless devices transmit to the selected access node to gain access to the wireless communication system.

16. The system of claim 15, wherein the processing node is further configured to:
select another access node comprising a next-largest coverage radius from among the first access node and the second access nodes;
calculate a second number of root sequences required for the selected another access node based on the coverage radius of the selected another access node; and
assign root sequences to the selected another access node according to the second number of root sequences required.

17. The system of claim 16, wherein the root sequences assigned to the selected another access node are different than the root sequences assigned to the selected access node.

18. The system of claim 16, wherein the root sequences assigned to the selected access node are not assigned to the selected another access node and to an access node of the neighbor list of the another access node.

19. The system of claim 15, wherein the processing node is further configured to:
calculate a cyclic shift for the selected access node; and
calculate the number of root sequences node based on the cyclic shift.

20. The system of claim 15, wherein the processing node is further configured to transmit the assigned root sequences to the selected access node.

* * * * *